United States Patent [19]

Goldshlag et al.

[11] Patent Number: 5,136,695

[45] Date of Patent: Aug. 4, 1992

[54] APPARATUS AND METHOD FOR UPDATING A REMOTE VIDEO DISPLAY FROM A HOST COMPUTER

[75] Inventors: Nathan L. Goldshlag, Cambridge; Benjamin A. Wells, Newton, both of Mass.

[73] Assignee: Reflection Technology, Inc., Waltham, Mass.

[21] Appl. No.: 435,771

[22] Filed: Nov. 13, 1989

[51] Int. Cl.$^5$ .............................................. G06F 3/14
[52] U.S. Cl. ........................... 395/275; 364/DIG. 1; 340/799
[58] Field of Search ............... 364/200, 900; 340/799; 395/275

[56] References Cited

U.S. PATENT DOCUMENTS

| | | | |
|---|---|---|---|
| 4,570,161 | 2/1986 | Kummer et al. | 340/799 |
| 4,688,190 | 8/1987 | Bechtolsheim | 364/900 |
| 4,695,838 | 9/1987 | Ellis, Jr. | 340/771 |
| 4,755,810 | 7/1988 | Knierim | 340/799 X |
| 4,789,856 | 12/1988 | Yokota et al. | 340/720 |
| 4,802,118 | 1/1989 | Honda et al. | 364/900 |
| 4,868,556 | 9/1989 | Murakami et al. | 340/799 |
| 4,882,578 | 11/1989 | Minakuchi | 340/799 X |
| 4,985,848 | 1/1991 | Pfeiffer | 364/518 |

Primary Examiner—Michael R. Fleming
Assistant Examiner—Glenn A. Aure
Attorney, Agent, or Firm—Wolf, Greenfield & Sacks

[57] ABSTRACT

Apparatus and a method are disclosed for reducing the transmission power required when a host computer displays video information on a remote video display. A video memory is located in close proximity to the display so that the display can be periodically refreshed in the normal manner from the local memory. Consequently, the host computer need only transmit information regarding the portions of the local memory that have changed since the last data transmission. Since the information for the entire local memory is not transmitted each time the memory must be updated and in particular, each time the display must be refreshed, the required data transmission rate between the host and the display is greatly reduced from the rate normally required with prior art apparatus and, consequently, the power consumption is reduced. In addition, a data and command multiplexing scheme is used to minimize the number of data communication lines which must be used between the transmitting and receiving devices, thus further reducing the power consumed during data transmission.

10 Claims, 7 Drawing Sheets

| 7(MSB) | 6 | 5 | 4 | 3 | 2 | 1 | 0(LSB) |
|---|---|---|---|---|---|---|---|
| UPSIDE DOWN | STANDBY MODE | BLANK DISPLAY | LOW INTENSITY | RESERVED (0) | RESERVED (0) | RESERVED (0) | RESERVED (0) |

FIRST BYTE – COMMAND BYTE

| 7(MSB) | 6 | 5 | 4 | 3 | 2 | 1 | 0(LSB) |
|---|---|---|---|---|---|---|---|
| 0 | A14 | A13 | A12 | A11 | A10 | A9 | A8 |

SECOND BYTE (OPTIONAL) – HIGH BYTE OF STARTING ADDRESS

| 7(MSB) | 6 | 5 | 4 | 3 | 2 | 1 | 0(LSB) |
|---|---|---|---|---|---|---|---|
| A7 | A6 | A5 | A4 | A3 | A2 | A1 | A0 |

THIRD BYTE (OPTIONAL) – LOW BYTE OF STARTING ADDRESS

FIG. 8

APPARATUS AND METHOD FOR UPDATING A REMOTE VIDEO DISPLAY FROM A HOST COMPUTER

FIELD OF THE INVENTION

The present invention relates to electrical communications or transmission of information, and, more particularly, to communications systems and methods which provide data to a display or storage means.

BACKGROUND OF THE INVENTION

For many data processing applications, there is a need to transmit information between a data source and a display or between two memory-containing devices. The term "information" as utilized herein includes commands or instructions as well as data. One example of such data processing applications is that described in U.S. patent application Ser. No. 07/798,295, filed Jul. 27, 1987 for "Miniature Video Display System" by Allen Becker, now U.S. Pat. No. 4,934,773 and/or in U.S. patent application Ser. No. 07/200,645 filed May 31, 1988 for "Low Vibration Resonant Scanning Unit for Miniature Optical Display Apparatus" by Benjamin A. Wells now U.S. Pat. No. 4,902,083, both of which patent applications are hereby incorporated by reference herein.

These latter patent applications disclose miniature displays which need to be connected to a host computer or other source of data that generates and formats the displayed information. Conventionally, the information to be displayed is periodically sent from the host computer to the display whether or not the displayed information changes so that the display is periodically updated or "refreshed". The information is typically sent from the host to the display as a "bit map", in which each bit corresponds to a picture element in the display. Since a high-resolution display contains many such picture elements, and the refresh interval is generally short (often on the order of five milliseconds) a high peak data rate results (illustratively on the order of 50 MHz).

Where it is desired to provide data from a host computer to a refreshed display at a high data rate, several problems arise. First, the cabling for the data transfer is expensive. If a single cable is used to send the data via serial transmission, then a coaxial cable is required, as well as high-speed drivers and receivers. Alternatively, if the data is transmitted by parallel transmission, then multiple cables are required (although each cable can transmit at a lower data rate and can be driven by lower speed drivers and receivers) and the overall diameter of the cable bundle increases. Also, each separate cable in the bundle should either be a coaxial cable or else the entire bundle should be provided with an outer shield to keep RFI emissions to acceptable levels. The shielding further increases the cable bundle size and a larger cable bundle may be undesirable if the display itself is physically small, such as a heads-up or goggle-mounted display.

Another problem resulting from high data rate operation is the power dissipated when the cable is driven and the capacitance of the cable is charged and discharged every time the signal level rises and falls. For example, an eight foot long cable, with capacitance of 36 picofarads per foot, will dissipate over ⅛ watt when transmitting a 50 MHz TTL square wave. The dissipated power may, in some circumstances, be more power than that used by the display to which the cable is connected.

Accordingly, it is the general purpose of the present invention to provide apparatus and a method capable of providing controlled transfer of information from one device to another.

It is another object of the present invention to provide apparatus and a method for data communication that reduces the power wasted driving the communication cable and eliminates the need for multiple data cables or for a single very high speed link.

Yet other objects of the present invention are to provide apparatus and a method for data communication which allows updating the receiving device's bit map starting at an arbitrary byte boundary with an arbitrary number of bytes being updated, which allows passing commands or instructions such as status and control information to the second device using the same signal path used for transmission of data, which allows any data rate from zero to a maximum value and which allows the data transfer rate to change at any time without substantial risk of loss of the transferred information, which is independent of the resolution of the display or other second device, and which can transmit color and intensity information in digitally coded form.

Further objects of the present invention are to provide apparatus and method for information communication which is capable of a wide range of data transfer rates, which does not require a substantial number of data lines for such data transfer, which has reduced cable power consumption requirements, which is capable of transmitting commands or instructions as well as data, which is capable of transmitting data to specific address(es) or location(s) in the device receiving the data, which is capable of providing data transfer for all or a portion of the storage capacity of the device receiving the transferred data, which has reduced cabling cost requirements, which prevents loss of information if either device is not ready to transmit or receive such information, which is capable of repeatedly returning to a presettable starting address for transfer of data, and which does not require high data transfer rates for refresh.

Still further objects of the present invention are to provide apparatus and a method for transfer of information to a display which is capable of permitting refreshing of the display, which is capable of providing data transfer which is asynchronous with such display and its refresh, and which does not require a high data transfer rate to accomplish refreshing of the display.

SUMMARY OF THE INVENTION

Briefly, these and other objects of the present invention are accomplished by apparatus and a method for information communication wherein a "local" memory is provided in close proximity to a first data communications device so that the first device can be periodically refreshed in the normal manner from the local memory. Consequently, the second data communications device need only transmit information regarding the portions of the local memory that have changed since the last data transmission. Since the information for the entire local memory is not transmitted each time the memory must be updated and in particular, each time the first device must be refreshed, the required data transmission rate between the two devices is greatly reduced from the rate normally required with prior art apparatus and, consequently, the power consumption is reduced. In addition, a data and command multiplexing scheme is used to minimize the number of data communication lines which must be used between the transmitting and receiving devices, thus further reducing the power consumed during data transmission.

Particularly, a data communication line is provided for data and command information, another data communication line is provided for a clock signal, and a third line is provided for a command signal indicating the beginning of transmission. This line is further used to indicate the type of information (data or commands) which is being transmitted over the first line. An additional line may be provided for a receiving device to inform the transmitting device whether or not it is ready to receive data or commands. By monitoring the state of the clock line and the command line, the receiving device can ascertain whether the information which follows is data for updating the local memory or a command sequence.

Further, the receiving device can receive selected commands from the transmitting device, which commands specify a portion or section of the local memory which is to be updated by the following information. The update operation of the local memory is accomplished by utilizing an address register in the receiving device to generate address information for the local memory so that incoming data can be sequentially stored in successive memory locations. By means of command information received from the transmitting device, the "starting" value of the address register can be preset to a selected address, allowing only a portion of the local memory to be updated.

More particularly, control logic in the transmitting device controls the information provided on the data line, the clock signal provided on the clock line, and the command signal generated on the command line to indicate the type of data transfer. The transmitting device may be provided with a memory that stores the information to be transmitted thereby allowing the transmitting device to perform other tasks while data transmission is actually taking place.

The receiving device is also provided with control logic which, in response to the state of the signals on the command and clock lines as provided by the transmitting device, determines whether the received information is to be provided to the receiving device's status register, the receiving device's starting address register, or the receiving device's storage. Conventional registers and buffers are provided for accomplishment of information transfer.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
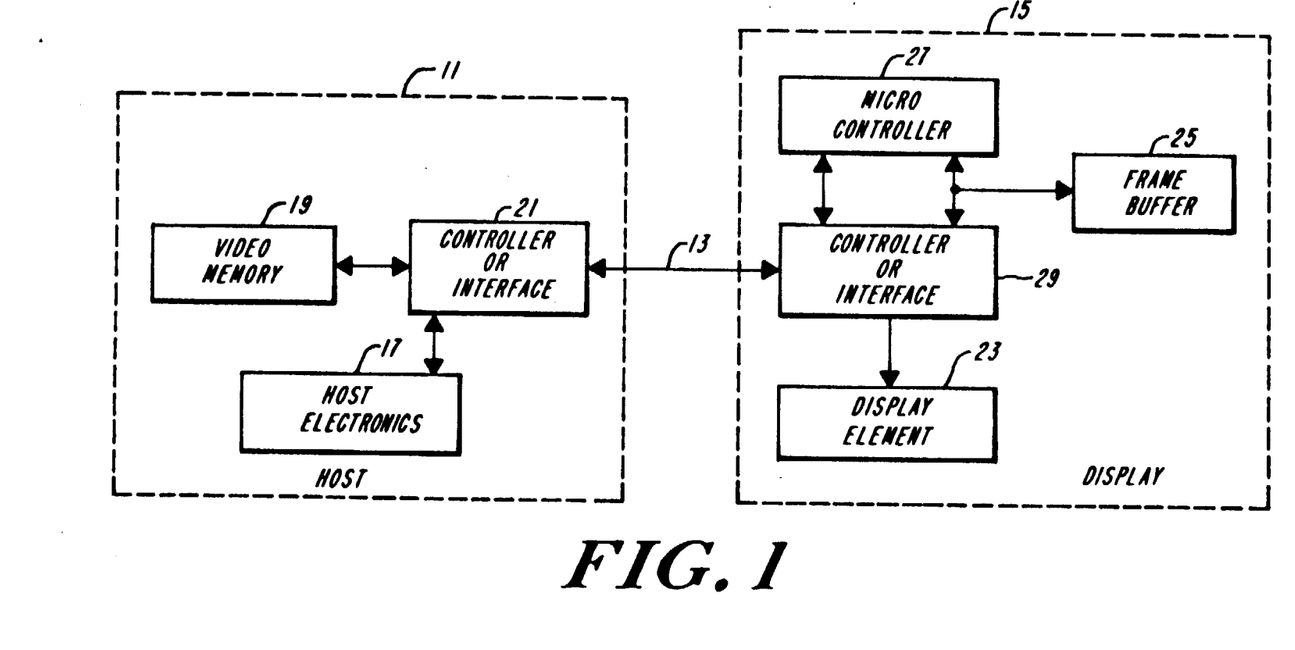
FIG. 1 is a block diagram of one embodiment of a data and command communication system according to the present invention.

Referring now to the drawings, wherein like reference characters designate like or corresponding parts or signals throughout the several views, there is shown in FIG. 1 a host computer or other device 11 connected via cable 13 to remote display 15. Host 11 includes host electronics 17, memory or other storage 19, and controller or interface 21. Controller or interface 21 communicates with host electronics 17, memory 19 and, via cable 13, display 15. Remote display 15 includes display element or device 23, memory or other storage 25, controller (such as a microprocessor) 27, and controller or interface 29. Controller or interface 29 communicates with display element 23, memory or other storage 25, controller 27 and, via cable 13, host 11. Memory or other storage 19 and 25 can for example each be a 32 kilobyte by 8 byte static random access memory (RAM) frame buffer capable of storing video data Host electronics 17 can for example comprise a host computer or a host processor. Cable 13 includes at least one (and preferably one) data line (DATA), preferably one clock (CLK) line, a command line for beginning of scan (BOS), a status line (READY) for receiving device 15 being READY or not to receive data or commands from transmitting device 11, one or more power lines for provision of power to remote display 15, and one or more ground lines for the same purpose. Preferably, one CLK line, one data line, one negative logic BOS line, one negative logic READY line, two power lines each bearing a DC current of +5 volts, and two ground lines are provided in cable or bus 13. Two wires are used for power to minimize voltage drop over long cables. Alternatively, one line could be used for power and one line for ground with heavier gauge wire for the power signals.

Besides power and ground, three signals are provided from host 11 to display 15 on cable 13: BOS, CLK, and DATA. One signal is provided from display 15 on cable 13 to host 11: READY.

Remote display 15 can for example be a display such as that described in U.S. patent application Ser. No. 07/798,295 filed Jul. 27, 1987 by Allen Becker for "Miniature Video Display System", or in U.S. patent application Ser. No. 07/200,645 filed May 31, 1988 for "Low Vibration Resonant Scanning Unit for Miniature Optical Display Apparatus" by Benjamin A. Wells, each of which patent applications is hereby incorporated by reference herein.

Figure 2:
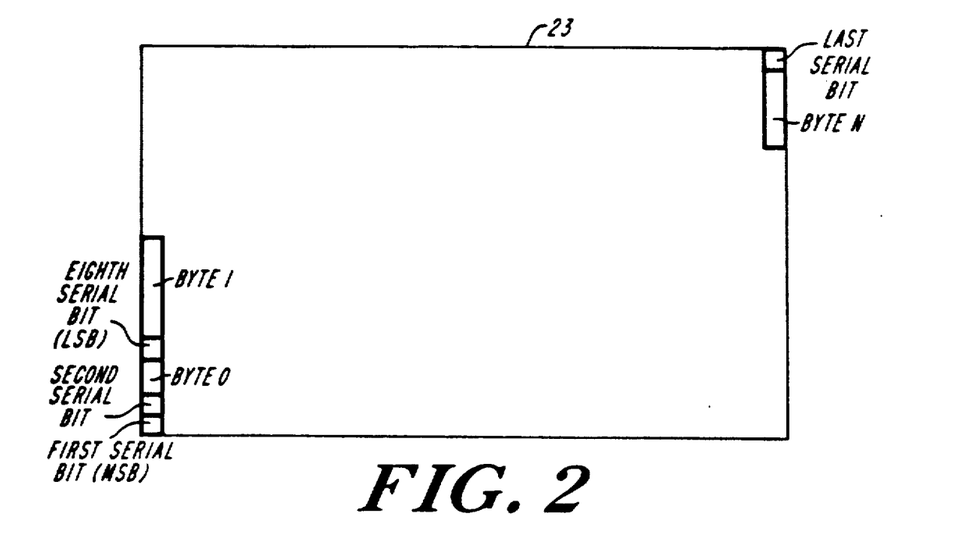
FIG. 2 is a diagrammatic representation of the refreshing sequence for one embodiment of a display that may be included in the present invention.

FIG. 2 shows a preferred mode for raster scan and screen organization for display element 23. If the entire display element 23 is to be updated, then serial video data is sent across cable or bus 13 in a predetermined sequence. The video image data is generally sent as a plurality of digital words. Each of the digital "bits" which make up each word corresponds to one picture element ("pixel") on the display screen. In the particular embodiment shown in FIG. 2, the predetermined data order begins with the bit corresponding to the pixel in the lower left hand corner of the display screen and continues with bits representing pixels that proceed vertically upwards in the left column, then to the lowest pixel in the second column from the left, etc until the bit representing the pixel in the upper right hand corner of the screen is sent. This predetermined bit/pixel pattern is shown in FIG. 2.

The actual image data is sent as a bit-map across the interface cable 13 to the display unit 15 where a full-screen image is stored in RAM 25. This data stored in RAM 25 is retrieved by sequentially generating addresses and retrieving information using the generated addresses. The addresses are generated in the same predetermined sequence as the data is transmitted. The addresses are generated sequentially starting with the address of the word containing the bit corresponding to the pixel in the lower-left corner of the display, proceeding vertically to the top of the first column of pixels, then horizontally column-by-column from the bottom of each column to its top until the last pixel in the upper-right corner of the display. For example, for a display of 280 pixels vertical by 720 pixels horizontal, if the start bit is identified as bit 0 (in byte 0), then the last bit of the first column is identified as bit 279 (in byte 34), and the last serial bit appearing at the upper right-hand corner of display element 23 would be bit 201599 (in byte 25199).

Figure 3:
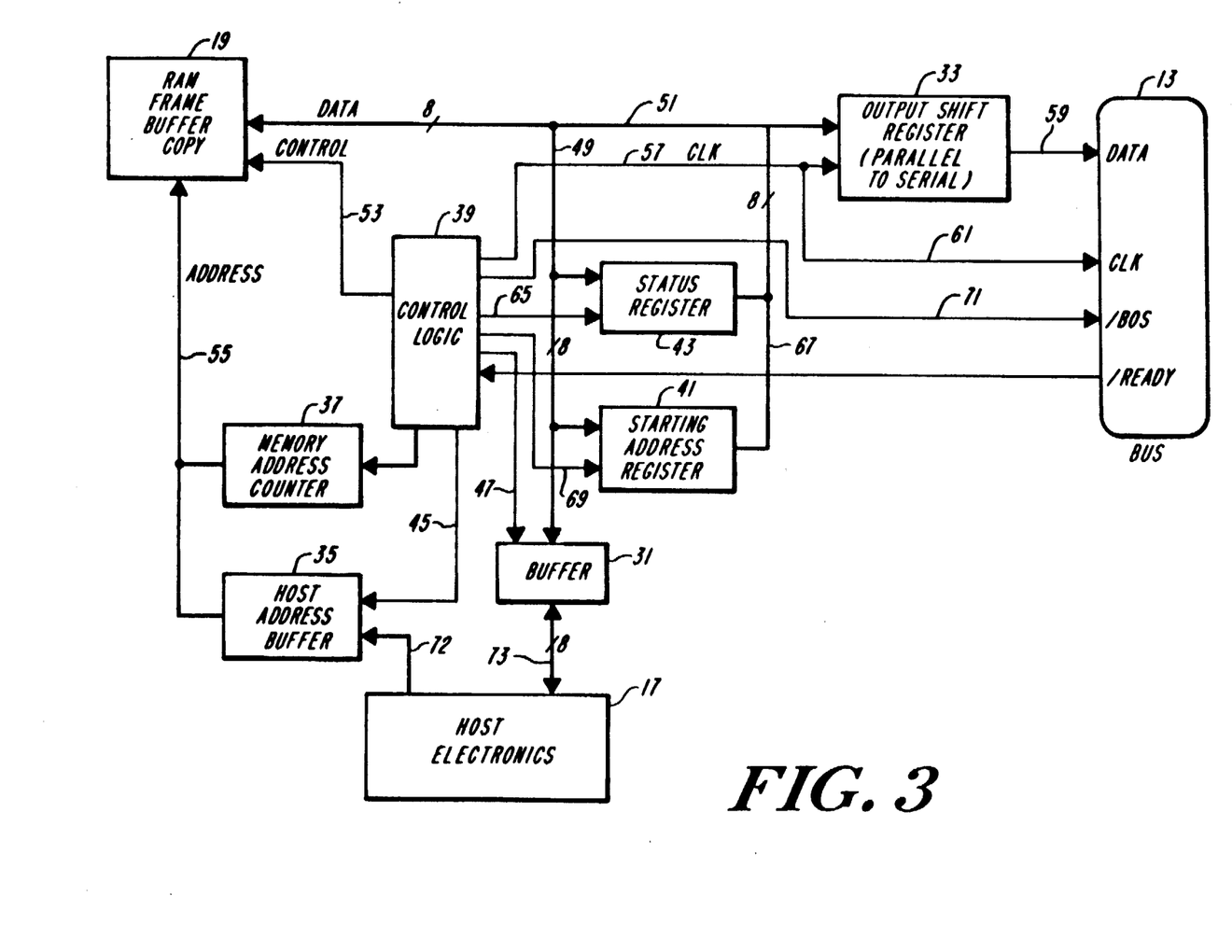
FIG. 3 is a block diagram of a portion of the transmitting device architecture for a portion of the present invention.

FIG. 3 illustrates the interface architecture of host 11. As shown in FIG. 3, information from host electronics 17 is provided to (or from) buffer 31. Data from buffer 31 can be provided to memory or other storage 19. Address bits from host electronics 17 are provided to host address buffer 35 so that the address stored in buffer 35 determines memory location for the writing or reading of data into memory or other storage 19 by host electronics 17. In order to access sequential memory locations, memory address counter 37 can also provide address information to memory 19 when incremented by control logic 39.

As will hereinafter be discussed in detail, control logic 39 can also provide a new starting address for transmission to display 15. This new starting address causes display 15 to update a portion of its internal memory starting at the specified address. The starting address is loaded from control logic 39 into starting address register 41 and transmitted, as described below to display 15.

Commands in the form of command or status bits that host electronics 17 wishes to provide to remote display 15 are provided via buffer 31 to status register 43 and from register 43 to output register 33. Control logic 39 controls whether the contents of memory 19, status register 43 or starting address register 41 are to be provided to output shift register 33.

Figure 3A:
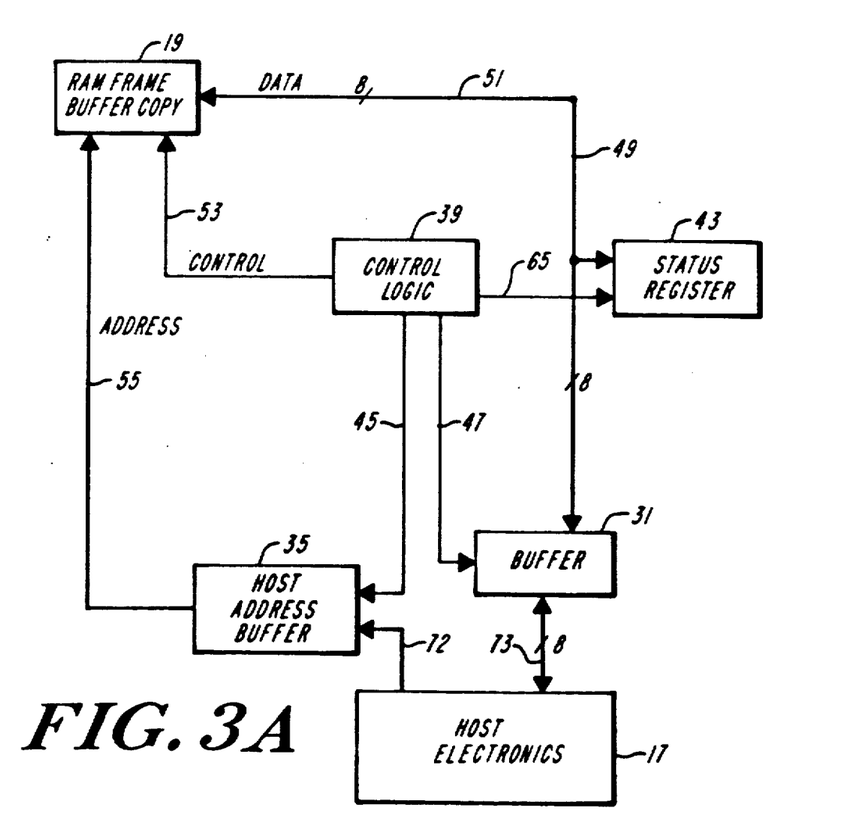
FIGS. 3A, 3B, and 3C each is a portion of the block diagram of FIG. 3, provided for easier understanding of operation of the system of FIG. 3.
Figure 3B:
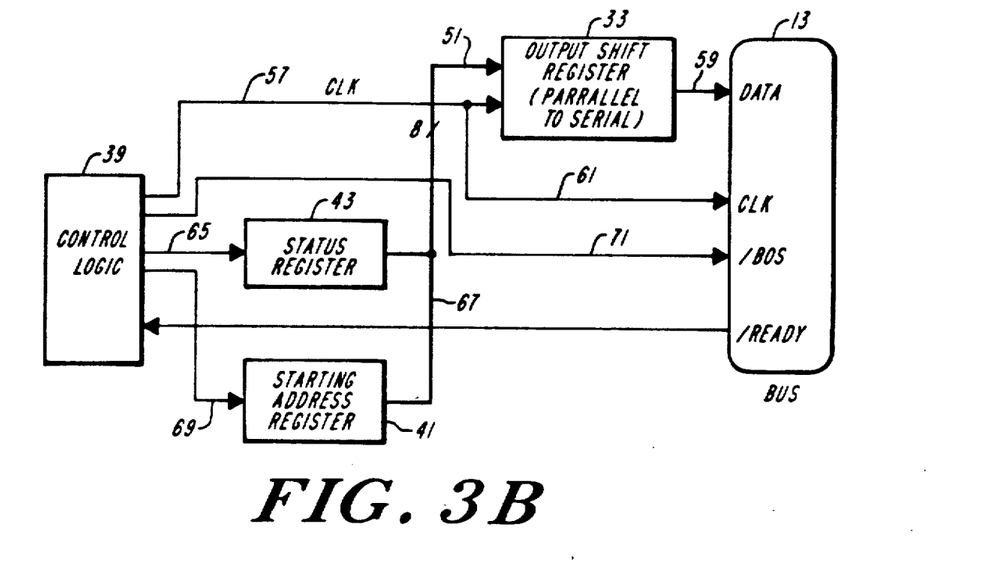
Figure 3C:
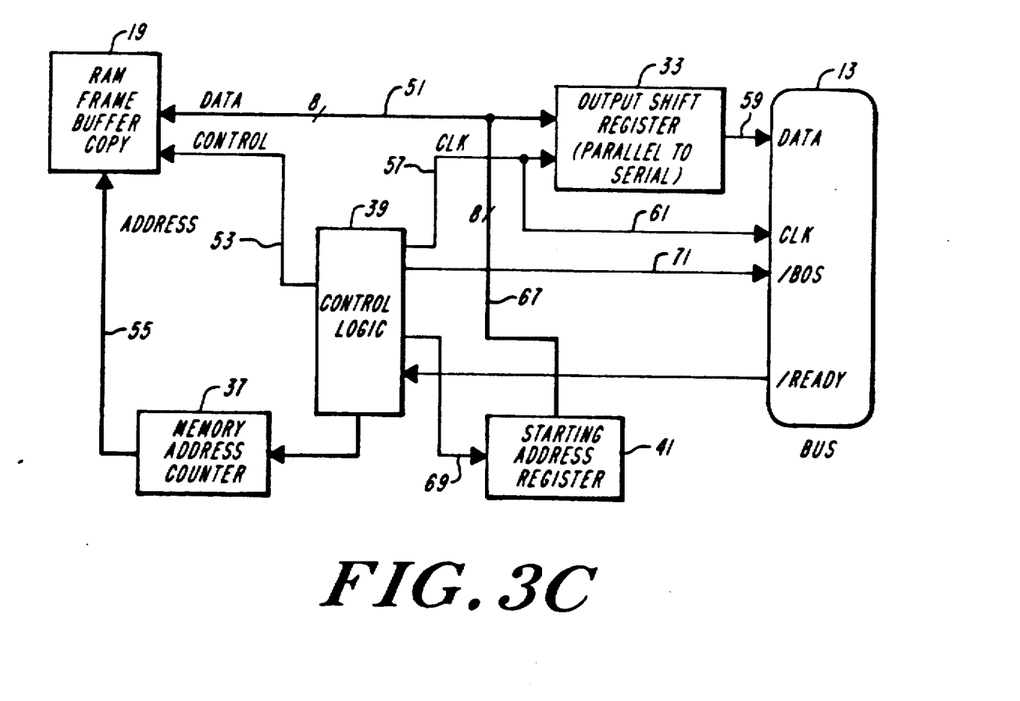

FIGS. 3A–3C illustrate the interface architecture of host 11 during several modes of operation. FIG. 3A shows the configuration and operation of the system when the host 11 accesses status register 43 or memory 19. FIG. 3B shows the configuration and operation of the system when the controller sends command information to the remote display and FIG. 3C illustrates transmission of data to the remote display.

As shown in FIG. 3A, host electronics 17 can write data to be transmitted to the remote device 15 into RAM memory 19 As previously mentioned, the dual use of RAM 19 by the host electronics 17 and control logic 39 allows host 17 to perform other tasks while the data is being transmitted by the control logic 39.

The data to be transmitted is provided to RAM 19 via data buffer 31 and bus 49. RAM address information from host electronics 17 can be applied to RAM 19 via address buffer 35 and bus 55. Host electronics 17 may also write information into status register 43 by means of buffer 31 and bus 49 and retrieve information from RAM 19 by means of bus 49 and buffer 31 under control of address information provided to RAM 19 via register 35 and bus 55. Control logic 39 prevents transmission of data from RAM 19 to the remote display while host electronics 17 is writing data into RAM 19 or reading data out of RAM 19.

FIG. 3B illustrates the operation of the controller circuitry when command information is sent to the remote device 15. This command information may take the form of a status word or the starting address for subsequent update data for the remote device memory. In order to start the transfer, control logic 39 asserts the BOS signal (places a "low" signal on the BOS lead) by means of lead 71 to indicate to the remote device that an information transfer is about to begin. Clock signals are also provided to the remote display by control logic 39 via lead 61 and line CLK.

Under control of logic 39 on lead 65, the contents of the eight-bit status register 43 are transferred in parallel to output shift register 33 over bus 67. From register 33, data is clocked serially in a conventional manner onto the DATA line for transmission to the remote display. As will be hereinafter described, since the data is transmitted with the BOS line asserted, the remote display will interpret the data as command information. Optionally, at this time, the high-order information bits from the starting address register 41 may be transferred to output register 33 via bus 67 and transmitted to the remote display. At the end of the data transmission, control logic releases the BOS signal (places a "high" logic level on the BOS lead).

In the preferred embodiment, control logic 39 controls transmission of data as follows. As illustrated in FIG. 2, the complete bit-map image contains 720×280 picture elements or pixels, stored as 25,200 bytes of data in RAM 19. The image area is divided into 25 segments of 1024 bytes, based on the high order address bits of RAM 19 as monitored line 54. A 25 bit "modified" register is maintained in control logic 39 corresponding to the segments. Whenever host electronics 17 writes to an address in RAM 19, the corresponding bit in the modified register of control logic 39 is set (i.e. made 1) by control logic 39. Control logic 39 continuously test the bits of its modified register, sequentially from 1 to 25. Whenever any bit is found to be set (has a value of 1), the following sequence is initiated First, the set of the modified register of control logic 39 is reset (i.e. made 0). Second, the starting address of the segment identified by the just reset bit is sent to remote display or other device 15, according to the sequence described earlier with regard to FIG. 3B.

Third, 1024 bytes are sent to remote display or other device 15 according to the sequence describe above with regard to FIG. 3C. For a single byte change to RAM 19, a total of 1024 bytes of data are sent to remote display or other device 15. If instead many bytes of data are changed in RAM 19, a minimum of 2048 bytes are sent from host 11 to display or other device 15.

FIG. 3C illustrates the circuitry when data is sent from RAM 19 to the remote display. In this case control logic 39 causes the BOS signal to be asserted via lead 71. As with the transfer of control information, the BOS signal informs the remote display that a new information transfer is about to begin. Subsequently, the contents of starting address register 41 are transferred into memory address counter 37.

Control logic 39 then removes the BOS signal. As will be hereinafter described, data transfer with the BOS signal de-asserted will cause the remote display to interpret the incoming data as data and not as command signals.

Subsequently, data is read from RAM memory 19 at the address provided by memory address counter 37 and transferred in parallel to output shift register 33 by means of bus 51. Finally, the data is clocked onto the DATA line and transmitted to the remote display in a conventional manner. Control logic 39 then increments register 37 to generate the next sequential address and the next data byte is read out of memory 19 and sent to the remote device. This sequence is repeated until the desired number of data bytes (1024) have been read out of memory 19 and transmitted to the remote display.

Figure 4:
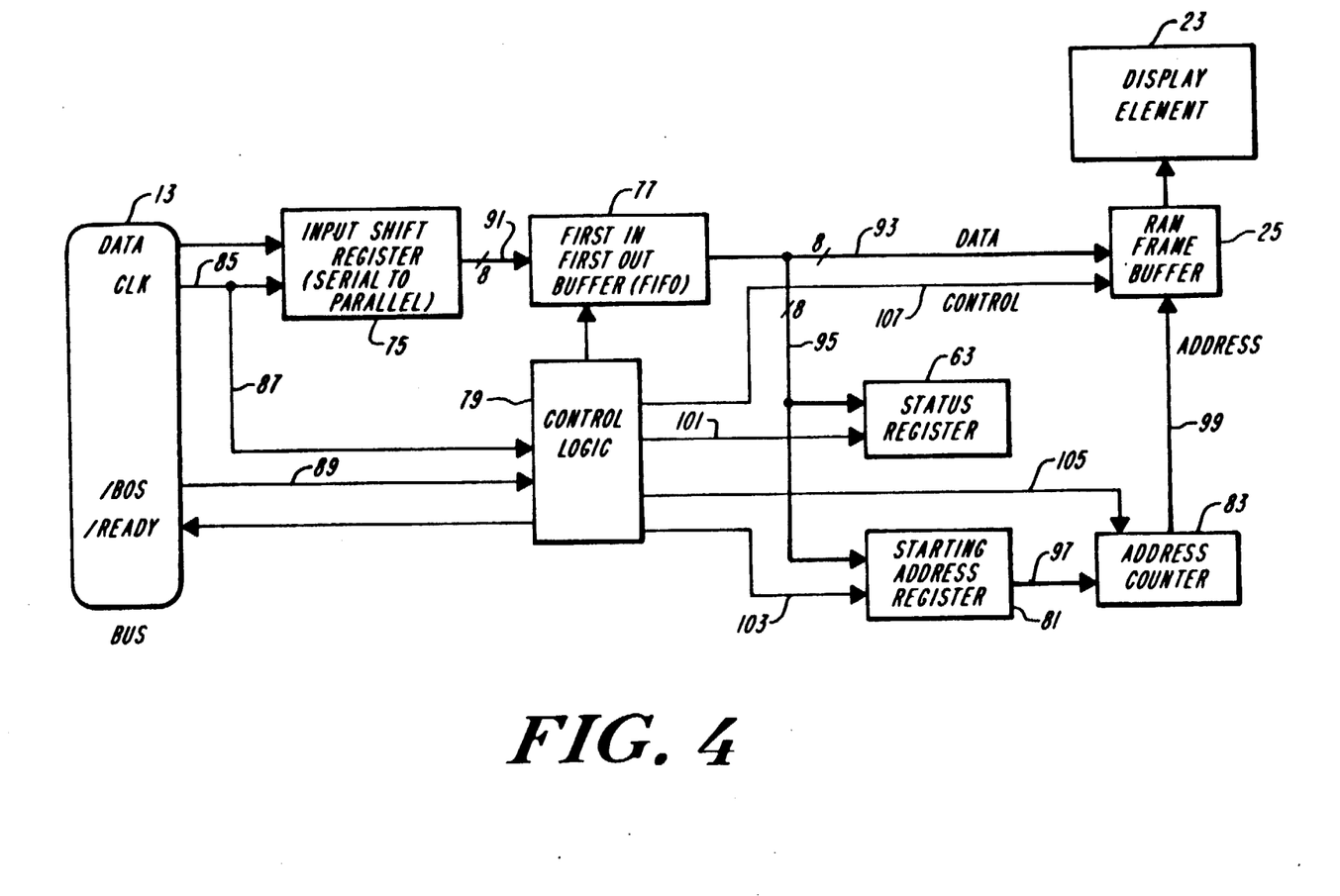
FIG. 4 is a block diagram of a portion of the architecture for a data and command receiving device of the present invention.

As shown in FIG. 4, display 15 includes input shift register 75, which in the preferred embodiment is a serial to parallel shift register where data appearing on the DATA line of cable 13 is received by register 75 in serial form. Display 15 also includes first in first out (FIFO) buffer 77, control logic 79, status register 63, starting address register 81, address counter 83, and memory 25. Control logic 79 provides an inactive signal on the READY line of cable 13 to control logic 39 of host 11 when display 15 is not ready to receive data or other instructions. The clock signal CLK provided by cable 13 from control logic 39 of host 11 clocks or strobes input shift register 75 via line 85, and clocks or strobes control logic 79 via line 87. The BOS signal, provided to control logic 79 on line 89 from the BOS line of cable 13 and control logic 39 of host 11, informs control logic 79 whether instructions are to be interpreted as data or commands as previously described.

Data received via cable 13 from host 11 is shifted by clock signal CLK into input shift register 75. When 8-bits have come in, the data from input shift register 75 is written via bus 91 into first-in, first-out buffer 77. FIFO buffer 77 is included to avoid any need to have host 11 stop sending data instantaneously upon receipt of an active READY signal from display 15. Data from FIFO buffer 77 is written to RAM frame buffer 25, using an address from address counter 83. Address counter 83 is reloaded from the starting address register 81 when an active BOS pulse occurs, but otherwise address counter 83 continues to increment as new bytes of data are received and written to RAM 25.

Control logic 79 can also load the contents of input shift register 75 into status register 63 or starting address register 81 if data is sent when the BOS signal from cable 13 is active.

The content of memory 25 is also used to refresh display element 23 of display 15 in a manner described in U.S patent application Ser. No. 07/798,295 or in U.S. patent application Ser. No. 07/200,645, both referred to above and incorporated by reference.

Bit-map memory 25 is located in the same enclosure as display element 23 The entire bit-map is still read out each time display element 23 is refreshed, but the refresh data only travels a relatively short distance from memory 25 to display element 23. This short travel distance effectively eliminates the need for large shielded cables, and the accompanying power loss.

Display 15 can continuously display the image defined by the bit-map contained in memory 25. In the preferred embodiment, every 20 milliseconds, the content of screen buffer 25 is read out and displayed to refresh the image on display element 23. This process takes approximately 5 milliseconds in the preferred embodiment If memory 25 is a "dual port" memory, then host 11 can write to screen buffer memory 25 at any time. If memory 25 is a conventional memory, then host 11 can only access bit-map memory 25 when display element 23 is not being refreshed. The READY line of cable 13 is used to indicate whether display memory 25 is presently available for access by host 11. At all times, control logic 39 of host 11 monitors the READY line and ceases transmitting data when the READY signal is false.

Transmission of data is synchronized by clock signal CLK. In other words, the DATA bit is clocked into screen buffer 25 on a rising edge of clock signal CLK.

To update the entire screen of display element 23, control logic 39 of host 11 sends an active BOS pulse, and then sends data bytes with accompanying clock CLK pulse rising edges until the bit-map for the entire screen, as stored in memory 25, has been updated. To update only a portion of the content of display element 23, host 11 need not send an entire screen of data as described above, but may cease at any time, in effect sending only a partial screen For that situation, the sequence of clock pulses on line CLK would end before the last serial bit 210599 for a 280×720 pixel screen is reached. A new BOS pulse, and a new sequence ±or screen data transmission, may be started at any time. Also, starting address register 81 containing a starting address is maintained in display 15. An active BOS pulse loads address counter 83 with the contents of starting address register 81. In the preferred embodiment, the power-up starting address is zero, which would enable updating of the beginning of the screen, as described above with regard to FIG. 2.

Control register or status register 63 of display 15 can be set by host 11 to control the intensity of the display and other qualities, as discussed below with regard to FIG. 8.

A pulse on the BOS line of cable 13 marks the beginning of transmission of an image map. Whenever READY is asserted by display 15, data may be placed on the DATA line by host 11, with a "true" state of each data bit indicating an "on" pixel. The data is strobed by host control logic 39 with clock signal CLK at any rate up to a preset maximum, which in the preferred embodiment is a clock frequency of 8 MHz. Display 15 will continuously refresh the image on display element 23 with the current contents of its full-screen memory 25, as discussed above. A partial transfer of any sequentially contiguous region of the image can be transmitted by using an appropriate data transfer sequence of FIG. 5 or starting address register 81 loading sequence of FIG. 7. When the READY line is false or inactive, host 11 must refrain from transmitting data, since display 15 is then busy refreshing display element 23 from local RAM 25. This will require interrupting and resuming the data transmission based on the state of the READY line. During the time that the BOS signal is asserted, certain control information and commands may be transmitted by host 11 to display 15. For example, optional modes (standby, blank, upside-down, or dim) or a substitute starting memory address can be sent to override the default or power-up parameters.

In the preferred embodiment, clock signal CLK can have a frequency when active of 0 to 8 MHz, as determined by host 11. Signal levels are preferably complementary MOS (CMOS) signal levels. Cable 13 is preferably shielded. Control logic 39, control logic 79 and the various buffers and registers of FIGS. 3 and 4 can be implemented in the form of CMOS integrated circuit such as application-specific integrated circuits (ASICs).

Parallel buses 49, 51, 55, 72, 73, 91, 93, 95, 97 and 99 in the preferred embodiments are each 8 bits wide.

Figure 5:
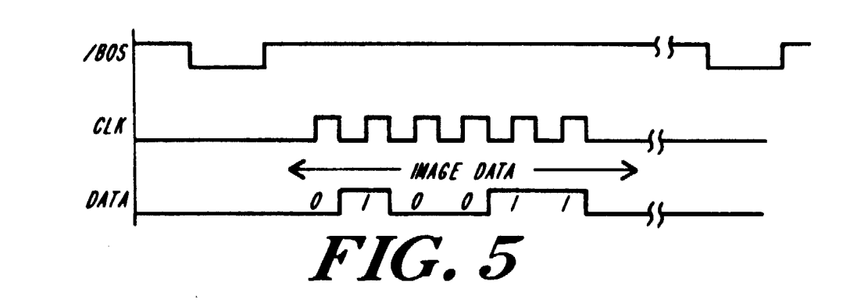
FIG. 5 is a waveform timing chart describing one set of signals generated by the system of FIG. 3 and received by the system of FIG. 4.

FIG. 5 illustrates the sequence of signals from host 11 to display 15 on cable 13 for transfer of data only. Initially, a relatively short active BOS pulse is generated by control logic 39. After the BOS line returns to its inactive state, clock pulses appear on clock line CLK, and data appears on the DATA line of cable 13. The DATA signals are synchronized such that each byte of data is clocked in by a rising or leading edge of a clock signal CLK pulse. This synchronization is accomplished by the use of clock signal CLK to clock or strobe data out of shift register 33 and into shift register 75. Since each data bit is clocked in by a rising edge of clock signal CLK, lack of a rising edge prevents transfer of any corresponding bit of data.

Figure 6:
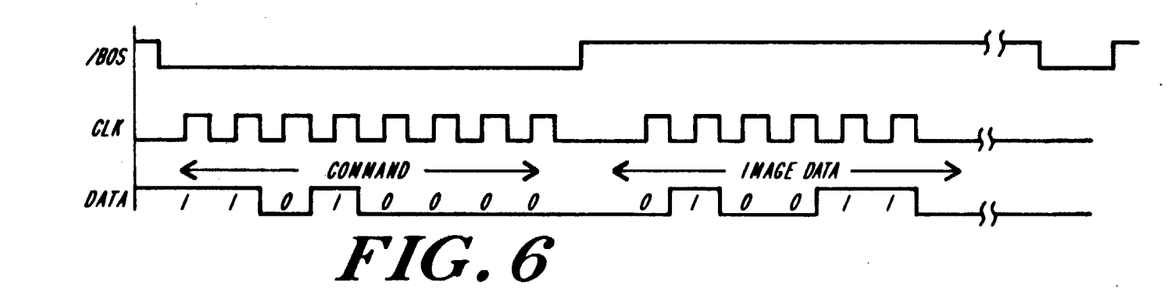
FIG. 6 is another waveform timing chart describing another set of signals generated by the system of FIG. 3 and received by the system of FIG. 4.

For transfer of a command byte with or without subsequent transfer of data, the signal sequence of FIG. 6 is utilized. As shown in FIG. 6, the BOS pulse stays active while the data is sent by active clock signal CLK pulses. For the preferred embodiment, the command byte is 8 bits wide, so that eight rising edges of clock signal CLK are required to strobe that byte into status register 63. After an appropriate short delay (such as one clock signal CLK cycle) after the end of the active BOS signal pulse, as shown in FIG. 5 as well as in FIG. 6, clock signal CLK can again be used to clock in data on the DATA line, such as is also shown in FIG. 5. However, if no data is to be provided at that time, then no clock signal CLK pulses should appear on the clock line CLK of cable 13.

Figure 7:
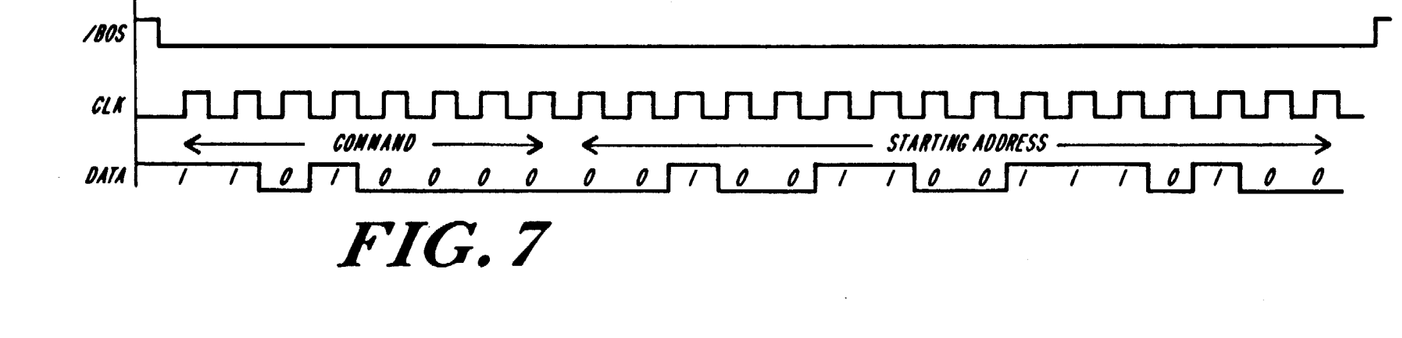
FIG. 7 is yet another waveform timing chart describing a third set of signals that can be generated by the system of FIG. 3 and received by the system of FIG. 4.

The appropriate signal sequence for provision of a new starting address to starting address register 81 of display 15 is shown in FIG. 7. In FIG. 7, the BOS signal stays active for a sufficient number of clock periods to clock in both an appropriate command word which can be 8 bits wide, and a starting address word which can be 16 bits wide. The BOS signal goes inactive after the command and starting address bits have been clocked into display 15. After the BOS signal goes inactive, clock CLK pulses and data can be provided to display 15 on cable 13 in a manner similar to that shown in FIGS. 5 and 6, or else no data need be provided at this time.

Clock signal CLK is the clock used by control logic 79 to clock data into display 15. Data and command bits are latched on the rising edge of signal CLK. Signal CLK should remain at a low level if data is not being transferred, to save power. Signal CLK is in the preferred embodiment received by a CMOS Schmitt trigger input. It is driven by host 11 and is a variable frequency, preferably up to 8 MHz.

DATA is the data input to display 15. Signal DATA is latched on the rising edge(s) of signal CLK. If signal CLK rising edges occur when signal BOS is active, the DATA latched will be interpreted as a command byte followed by an optional two-byte starting address DATA should remain at a low level if data is not being transferred to save power. DATA is received by a CMOS Schmitt trigger input. DATA is driven by host 11.

Beginning Of Scan signal BOS is an active low signal used to indicate the beginning of a video frame transfer. If signal CLK rising edges occur when signal BOS is active, the DATA latched will be interpreted as a command byte followed by an optional two-byte starting address. After the signal BOS pulse becomes inactive, video data beginning at the address sent to starting address register 81 of display 15 will be transferred in the manner shown in FIG. 2. Signal BOS should remain at a high level if data is not being transferred, to save power. Signal BOS is received by a CMOS Schmitt trigger input. Signal BOS is driven by control logic 39 of host 11.

Signal READY is an active low signal which indicates that display 15 is ready to accept data. When it becomes inactive (high), at most three more bytes of serial data will be accepted by FIFO buffer 77. Signal READY is a CMOS level signal capable of driving a 16 milliampere load at TTL levels, and is driven by control logic 79 of display 15. Signal READY should be received by a Schmitt trigger input in host 11 for maximum noise immunity.

After power-up, frame buffer 25 in display 15 is filled with zeros (off) by control logic 79. There are two ways to send partial screens when it is desired to change something on display element 23. These two methods avoid sending full screens of data to display 15, in order to conserve power and/or maximize screen update performance. After a BOS pulse as shown in FIG. 5, control logic 39 could send data for a partial screen beginning at address 0 and ending at an interim address preceding the last byte of FIG. 2. An integral number of bytes should be preferably transmitted; in other words, transmission of partial bytes is not preferred. Also, display 15 includes starting address register 81 which by default is set to zero. If desired, a new starting address can be transmitted during an active BOS pulse as shown in FIG. 7. After that BOS pulse, display 15 will write the first byte that is sent into frame buffer 25 at the new starting address, with the next byte being sent at the next incremented address, etc. until the next active BOS pulse occurs. A short BOS pulse as shown in FIG. 5 would reset display 15 to the new starting address in starting address register 81. All or part of the data for the portion of the display element from the new address through the last byte thereof could be sent, depending on how long clock signal CLK pulses are provided on cable 13.

If a new active BOS pulse occurs at any time, display 15 will begin accepting data at the current value of starting address register 81.

If desired, the data for the entire screen of display element 23 could be sent from host 11 to display 15 by writing nothing to starting address register 81 after power-up and sending entire screens of video data across cable 13 whenever ( any byte of the display changes.

For a clock and video data rate of 8 MHz, a 280×720 pixel screen can be fully refreshed at a rate of 30 frames per second, which is within the requirements of animation speed. Since frame buffer 25 is included in display 15, there is no requirement that the entire screen be continuously updated, but rather the entire screen be periodically updated, with the period of update and a video clock rate determined by host electronics 17. This allows host 11 to make the power and speed tradeoffs appropriate to the particular design or configuration being utilized. Display 15 would continue to refresh what is shown on display element 23 independently with whatever is currently in its frame buffer 25 at a rate sufficiently high to prevent any flicker appearing on display element 23.

Since clock signal CLK is under the control of host 11, the clock period can vary. Clock signal CLK could even stop pulsing for a period of time without loss of data, except that any data transfer then in progress would be delayed for that period. If the resolution or size of display element 23 includes a smaller number of pixels than the bit capacity of memory 25 and/or memory 19, then the unused bits should be loaded with zeros by host electronics 17.

While display 15 is refreshing the image displayed on display element 23 (about 5 milliseconds or a 25 percent duty factor) data cannot be received by display 15 from host 11. The READY signal will be active when data can be received by display 15 and will be inactive when data cannot be so received Since FIFO buffer 77 can for example have a capacity of 4 bytes, for that situation at most 3 bytes of data should be transmitted after the READY signal is made inactive since there may be one byte in FIFO buffer 77 waiting to be written to frame buffer 25 after the lock out period.

Figure 8:
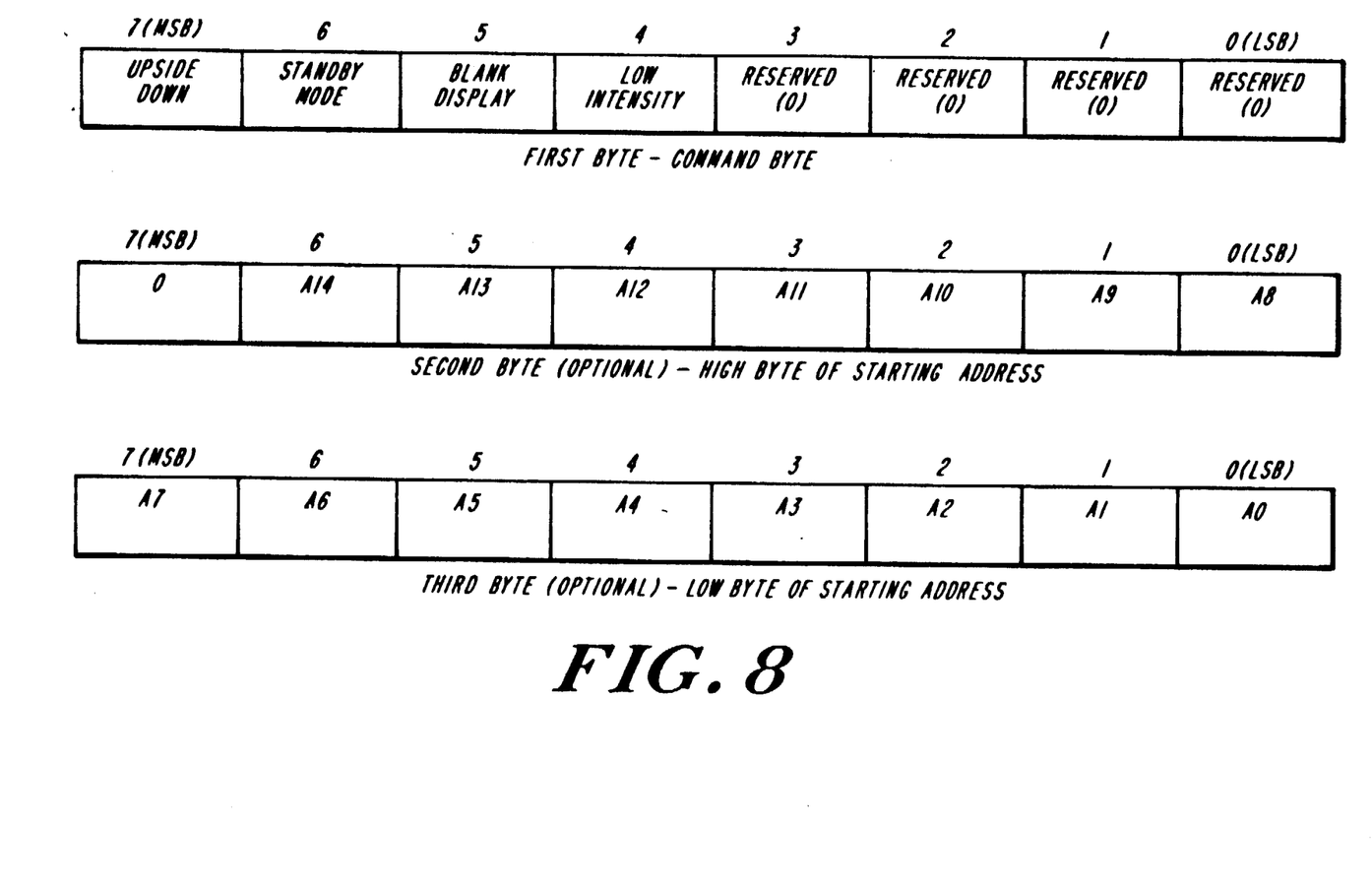
FIG. 8 is a diagrammatic representation of one format of command byte and starting address generated by the system of FIG. 3 and received by the system of FIG. 4.

FIG. 8 shows one command byte and starting address format that may be employed by the present invention, particularly with regard to FIGS. 6 and 7. The first byte of FIG. 8 is the command byte of FIGS. 6 and 7. The second and third bytes of FIG. 8 are respectively the high and low bytes of the starting address of FIG. 7. As previously discussed, the command byte of FIG. 8, if provided alone, is to be provided to status register 43 and status register 63, to control various qualities of the display on display element 23. The second and third bytes, if provided as in FIG. 7, would be stored in starting address registers 41 and 81

Although the invention is not to be construed as being limited thereto, the first four bits of the command byte of FIGS. 6 and 8 have the following values. The most significant bit, bit 7, provides a normal display when the bit is at zero, and an inverted display with the image rotated 180 degrees if the bit value is one. Command bit 6 has a value of zero for normal display operation and a value of one for low power mode wherein no display is presented by display element 23 which is held at minimum power Command bit 5 has a value of zero to have display element 23 enabled, and a value of one for a blank display with display element 23 turned off. None of the command bits, such as but not limited to command bits 6 and 5, effect the contents of screen buffer 25. Command bit 4 has a value of zero for presenting the entire screen of display element 23 at full intensity, and a value of one where the entire screen of display element 23 is to be presented at low intensity. Reserved command bits can be written as zeros.

At times host 11 will want to transfer a command to display 15, or will want to transfer a new starting address for data in frame buffer 25. This is accomplished by the signal sequence of FIG. 6 wherein signal BOS is active along with signals CLK and DATA with 8 rising signals CLK edges to transfer one command byte plus and optional 16 rising signal CLK edges to transmit a starting address as in FIG. 7. The format of the command byte and starting address 2 bytes is shown in FIG. 8. As with data transfers, the most significant bit (MSB) of each byte is sent first and the least significant bit (LSB) is sent last. The default or power-up configuration for the command byte and starting address is all of the bits being zero. A data transfer need not follow a command transfer or a transfer of starting address, provided no rising signal CLK edges follow transfer of the command byte with or without starting address.

It should be understood that, although CMOS devices and levels are preferred, the present invention can be used in similar fashion with similar operation with devices other than those illustrated. Also, other arrangements of command and starting address bits than those shown in FIGS. 5 through 8, and other screen display sizes than that shown in FIG. 2 can be utilized. Serial transmission of data is preferred to limit the size of cable 13. Nonetheless, the present invention can alternatively be utilized for transmission of parallel data from host 11 to display 15. Furthermore, provisions can be made for transmission of data from display 15 to host 11. Such transmission could be accomplished utilizing an expanded READY line, or by provision of an additional set of circuitry similar to that of FIGS. 3 and 4 in devices 15 and 11 respectively. Also, although random access memory is preferred, other types of memory could be utilized as memory or other storage 19 and memory or other storage 25, e.g. battery-held random access memory, or programmable read only memory (PROM) or erasable programmable read only memory (EPROM).

Some of the many advantages of the invention should now be readily apparent. For example, novel information communication apparatus and method has been provided which is capable of accomplishing transfer of data, commands, etc. between two devices. Provision is made for updating the information stored in the receiving device in its entirety or in any contiguous part. Status and control information can be provided to the receiving device using the same signal path used for data. If a one-to-one data bit to pixel mapping is not required, additional data bits can be utilized to provide color and intensity information to the receiving device in digitally coded form. Although in the preferred embodiment the present invention can be utilized for transfer of data and other information from a host computer to a remote display, the preset invention can be used for transfer of data between any two devices capable of sending or receiving same. Provision is made for avoiding loss of data because the receiving device is otherwise occupied and cannot then process or store received data.

Obviously, many modifications and variations of the present invention are possible in light of the above teachings. It is therefore to be understood that the foregoing embodiments are presented by way of example only and that, within the scope of the appended claims and equivalence thereto, the invention may be practiced otherwise than as specifically described.

What is claimed is:

1. Apparatus updating a remote video display apparatus with video information generated by a host computer, stored in a host video memory and transmitted from said host video memory as digital words, along with control signals, to said remote video display apparatus, having a remote video memory, and means connected to said remote video memory and a remote video display for periodically refreshing said remote video display from video information stored in said remote video memory; said update apparatus comprising:

means in said host computer for selecting a portion of said host computer memory for updating;

means cooperating with said selecting means for generating one of said control signals identifying said selected portion of said host computer memory;

an address counter located in the said remote video display apparatus and responsive to control signals received from said host computer for generating memory addresses;

means responsive to said memory addresses for sequentially storing digital words received from said host video memory in said remote video memory; and means connected to said address counter and responsive to said one of said control signals for presetting said address counter to a predetermined count so that digital words received from said selected portion of said host video memory can be sorted in a corresponding selected area of said remote video memory.

2. Apparatus for updating remote video display apparatus according to claim 1 wherein said control signals comprise a command signal and a command word and said update apparatus further comprises means located at said remote display apparatus and responsive to said command signal for presetting said address counter to a predetermined count determined by said command word.

3. Apparatus for updating remote video display apparatus according to claim 2 wherein said digital words and said command word are transmitted from said host video memory and said host computer to said remote video display apparatus over a single signal path from said host computer to said remote video display apparatus.

4. A method for updating a remote video display apparatus with video information generated by a host computer, stored in a host video memory and transmitted from said host video memory as digital words, along with control signals, to said remote video display apparatus having a remote video memory, a remote video display and means for refreshing said remote video display from video information stored in said remote video memory, said method comprising the steps of:

A periodically refreshing said remote video display from video information stored in said remote video memory;

B selecting a portion of said host computer memory for updating;

C generating a predetermined one of said control signals identifying said selected portion of said host computer memory;

D generating remote video memory addresses when another of said control signals is received from said host computer, said remote video memory addresses beginning at a preset initial address value;

E sequentially storing digital words received from said host video memory in said remote video memory at remote video memory storage locations identified by said remote video memory addresses; and F generating said preset initial address value when said predetermined control signal is received from said host computer so that digital words received from said host video memory can be sorted in a selected area of said remote video memory.

5. A method for updating a remote video display apparatus according to claim 4 wherein the step of generating remote video memory addresses comprises the step of generating a plurality of sequential remote video memory addresses.

6. A method for updating a remote video display apparatus according to claim 5 wherein the step of generating a plurality of sequential remote video memory addresses comprises the step of sequentially incrementing said preset initial address value.

7. A method for updating a remote video display apparatus according to claim 6 wherein:

said control signals comprise a command signal and a command word; and said method further comprises the step of setting said preset initial address value to a value determined by said command word when the command signal is received.

8. A method for updating a remote video display apparatus according to claim 7 further comprising the step of:

transmitting said digital words and said command word from said host video memory and said host computer to said remote video memory over a single signal path from said host computer to said remote video display apparatus.

9. Update apparatus for selectively transmitting video display information from a host computer system over a band-limited transmission channel to remote video display apparatus, said host computer system having a host video memory for storing digital video display information, means for generating video display control signals and means for transmitting said digital video display information and said video control signals over said transmission channel, said remote video display apparatus having means for receiving said digital video display information and said control signals, a display video memory with a plurality of addressable storage locations and means for visually displaying the contents of said display video memory, said update apparatus comprising:

means responsive to one of said video control signals received at said remote video display apparatus for generating a starting address corresponding to one of said plurality of addressable storage locations;

means responsive to another of said video control signals received at said remote video display apparatus for generating a plurality of address signals, said plurality of address signals corresponding to a contiguous block of said plurality of addressable storage locations beginning with said one of said plurality of addressable storage locations; and means responsive to said plurality of address signals and to digital video display information received from said host video memory for storing said received digital video display information in said contiguous block of said plurality of addressable storage locations.

10. Update apparatus for selectively transmitting video display information from a host computer system over a band-limited transmission channel to a remote video display apparatus, said update apparatus comprising:

- a host video memory for storing digital video display information;
- means controlled by said host computer system for selecting a portion of said host computer memory to be updated, said portion consisting of a contiguous block of storage locations beginning with a starting address;
- means cooperating with said selecting means for generating a video display control signal indicating said starting address;
- means for transmitting said digital video display information and said video display control signal over said transmission channel;
- means for receiving said digital video display information and said video display control signal at said remote video display apparatus from said transmission channel;
- a remote video memory with a plurality of addressable storage locations;
- remote display means connected to said remote video memory for visually displaying video information stored in said remote video memory;
- means responsive to said video control signal received at said remote video display apparatus for generating a starting address corresponding to one of said plurality of addressable storage locations;
- means responsive to said starting address for generating a plurality of address signals, said plurality of address signals corresponding to a contiguous block of said plurality of addressable storage locations beginning with said one of said plurality of addressable storage locations; and
- means responsive to said plurality of address signals and to received digital video display information for storing said received digital video display information in said contiguous block of said plurality of addressable storage locations.

* * * * *

UNITED STATES PATENT AND TRADEMARK OFFICE
CERTIFICATE OF CORRECTION

PATENT NO. : 5,136,695
DATED : August 4, 1992
INVENTOR(S) : Nathan L. Goldshlag & Benjamin A. Wells It is certified that error appears in the above—identified patent and that said Letters Patent is hereby corrected as shown below:

Col. 13, line 4 -  insert --for-- after "Apparatus"

Col. 13, line 34 -  change "sorted" to --stored--

Col. 14, line 13 -  change "sorted" to --stored--

Signed and Sealed this

Twelfth Day of October, 1993

Attest:

BRUCE LEHMAN

Attesting Officer

Commissioner of Patents and Trademarks